(12) United States Patent
Goodfellow

(10) Patent No.: US 6,788,900 B1
(45) Date of Patent: Sep. 7, 2004

(54) SYSTEM FOR CHECKING THE OPERATION OF AN OPTICAL FILTER

(75) Inventor: Robert C Goodfellow, Northants (GB)

(73) Assignee: Marconi Communications Limited, Coventry (GB)

( * ) Notice: Subject to any disclaimer, the term of this patent is extended or adjusted under 35 U.S.C. 154(b) by 0 days.

(21) Appl. No.: 09/391,755

(22) Filed: Sep. 8, 1999

(30) Foreign Application Priority Data

Feb. 9, 1999 (GB) .............................................. 9902702

(51) Int. Cl.[7] .............................................. H04J 14/02
(52) U.S. Cl. ...................................... 398/87; 398/100
(58) Field of Search .............................. 398/87, 1, 100, 398/212; 385/37

(56) References Cited

U.S. PATENT DOCUMENTS

| 5,673,129 A | | 9/1997 | Mizrahi |
| 5,726,785 A | | 5/1998 | Chawki et al. |
| 5,859,717 A | * | 1/1999 | Scobey et al. .............. 359/124 |
| 5,887,107 A | * | 3/1999 | Newman et al. ............ 385/137 |
| 5,894,533 A | * | 4/1999 | Heise et al. .................. 385/14 |
| 5,943,152 A | * | 8/1999 | Mizrahi et al. ............. 359/187 |
| 5,982,791 A | * | 11/1999 | Sorin et al. .................... 372/25 |
| 6,111,681 A | * | 8/2000 | Mizrahi et al. ............. 359/187 |
| 6,160,931 A | * | 12/2000 | Asakura ....................... 385/24 |

FOREIGN PATENT DOCUMENTS

| EP | 0 794 445 A1 | 2/1997 |
| EP | 0 913 962 A2 | 5/1999 |
| EP | 0 930 741 A2 | 7/1999 |
| WO | WO 95/21864 | 8/1995 |

OTHER PUBLICATIONS

Patel, J.S., et al., "Frequency Tracking of Tunable Liquid–Crystal Wavelength Filter for WDM Transmission", IEEE Photonics Technology Letters, IEEE New York, vol. 3, No. 12, Dec. 1991.

* cited by examiner

Primary Examiner—John Tweel
(74) Attorney, Agent, or Firm—Kirschstein, et al.

(57) ABSTRACT

A system for checking the correct operation of a wavelength filter comprising a wavelength filter comprising a first selectively reflective element (SRE) for reflecting a first signal of a first wavelength and a second SRE for reflecting a second signal of a different wavelength. The system also detects the second signal reflected by the second selectively reflective element.

32 Claims, 3 Drawing Sheets

SYSTEM FOR CHECKING THE OPERATION OF AN OPTICAL FILTER

BACKGROUND OF THE INVENTION

The invention relates to the field of communications, in particular to wavelength filters including those used in wavelength division multiplexed optical communication systems, and more particularly to a means to determine the status and integrity of such wavelength filters.

Optical communications systems are a substantial and fast-growing constituent of communication networks. The expression "optical communication system", as used herein, relates to any system which uses optical signals to convey information. Such optical systems include, but are not limited to, telecommunications systems, cable television systems, and local area networks (LANs). Optical systems are described in Gowar, Ed. Optical Communication Systems, (Prentice Hall, N.Y.). Currently, the majority of optical communication systems are configured to carry an optical channel of a single wavelength over one or more optical waveguides. To convey information from a plurality of sources, time-division multiplexing (TDM) is frequently employed. In time-division multiplexing, a particular time slot is assigned to each signal source, the complete signal from one of the signal sources being reconstructed from the portions of the signals collected from the relevant time slots. While this is a useful technique for carrying information from a plurality of sources on a single channel, its capacity is limited by fibre dispersion and the need to generate high peak power pulses.

While the need for communication services increases, the current capacity of existing waveguiding media is limited. Although capacity may be expanded, e.g. by laying more fibre optic cables, the cost of such expansion is prohibitive. Consequently, there exists a need for a cost-effective way to increase the capacity of existing optical waveguides.

Wavelength division multiplexing (WDM) is now used for increasing the capacity of existing fibre optic networks. In a WDM system a plurality of optical signal channels are carried over a single waveguide, each channel being assigned a particular part of the spectrum. Ideally each channel will be allocated to a wavelength band centered upon a single wavelength. In practice, due to the shortcomings of available sources and spectral broadening due to the modulation on the carrier and due to the dispersion and propagation of transmission media, each signal channel will spread across the spectrum to a greater or lesser extent. References herein to "a wavelength" are to be interpreted accordingly.

Optical fibre networks have been explored to permit the transfer of optical signals carrying WDM channels (WDM signals) bearing analogue or digital data, from one optical fibre in one loop, ring, cell of a mesh or line of a network to a different loop, ring, cell of a mesh or line of the network directly, in optical form, without the need to convert the signals into electrical form at interconnection points of the network. These interconnection points (or nodes) comprise optical add-drop multiplexers OADMs or optical cross connects OXCs.

Several methods to achieve optical add drop multiplexing (or switching) and optical cross connect switching are described in the proceedings of the European Conference Optical Communications, September, 1998, Madrid, Spain and the Optical Fibre Conference, February 1998, USA.

A known method to achieve switching of a WDM signal from a set of WDM signals is to pass the set into a first port of an optical circulator. These WDM signals will exit the circulator at a second port. A series of tunable optical filters are positioned at the second port such that selected ones of the set of WDM signals are reflected by the series of filters back into the second port and other ones of the set are passed by the same series of filters. The reflected signals reenter the optical circulator at the second port and emerge at a third port.

A filter at the second port is required for each WDM signal. Switching is achieved by arranging that the filters may be de-tuned or adjusted by an amount comparable to the spectral width of the WDM signal. Hence, if a filter is arranged to normally reflect a particular WDM signal, tuning will cause it to pass that signal. Alternatively, the filter may be arranged to normally pass and on tuning to reflect a particular signal. This process allows any sub-set of WDM signals to be selected from the total set.

The large capacity of an optical fibre carrying WDM signals (e.g. 40 Gbit/s) and the potential value of the information content of the signals means that it is important to know which state a switch is in at any one time and that the switch device (i.e. the filter) will operate correctly when activated.

Thus there is a need for a method and a system to monitor the operation of the switchable filters in the switching and routing equipment of optical communications networks.

SUMMARY OF THE INVENTION

The present invention provides a system for checking the operation of a wavelength filter comprising a wavelength filter comprising a first selectively reflective element (SRE) for reflecting a first signal of a first wavelength and a second SRE for reflecting a second signal of a different wavelength; the system also comprising checking means for checking the operation of the wavelength filter by detecting the signal reflected by a particular one of the selectively reflective elements.

In a preferred embodiment the invention provides a system in which the particular one of the SREs is associated with a reflection wavelength band that lies outside of a data band and the other of the SREs is associated with a reflection wavelength band that lies inside of the data band.

In a further preferred embodiment the invention provides a system in which the filter comprises an adjusting means for adjusting the wavelength reflected by the first SRE and the wavelength reflected by the second SRE in which, in operation, adjustment of the wavelength reflected by the first SRE results in a corresponding adjustment of the wavelength reflected by the second SRE.

In a further, preferred embodiment, the invention provides a system in which the filter comprises an adjusting means for introducing a change in the wavelength reflected by the first SRE and automatically introducing a corresponding change in the wavelength reflected by the second SRE.

The present invention also provides a method for checking the operation of a wavelength filter comprising a first selectively reflective element (SRE) for reflecting a first signal of a first wavelength and a second SRE for reflecting a second signal of a different wavelength; the method comprising the step of detecting the signal reflected by a particular one of the SREs.

BRIEF DESCRIPTION OF THE DRAWINGS

Embodiments of the invention will now be described by way of example with reference to the drawings in which.

DETAILED DESCRIPTION OF THE PREFERRED EMBODIMENTS

Figure 1:
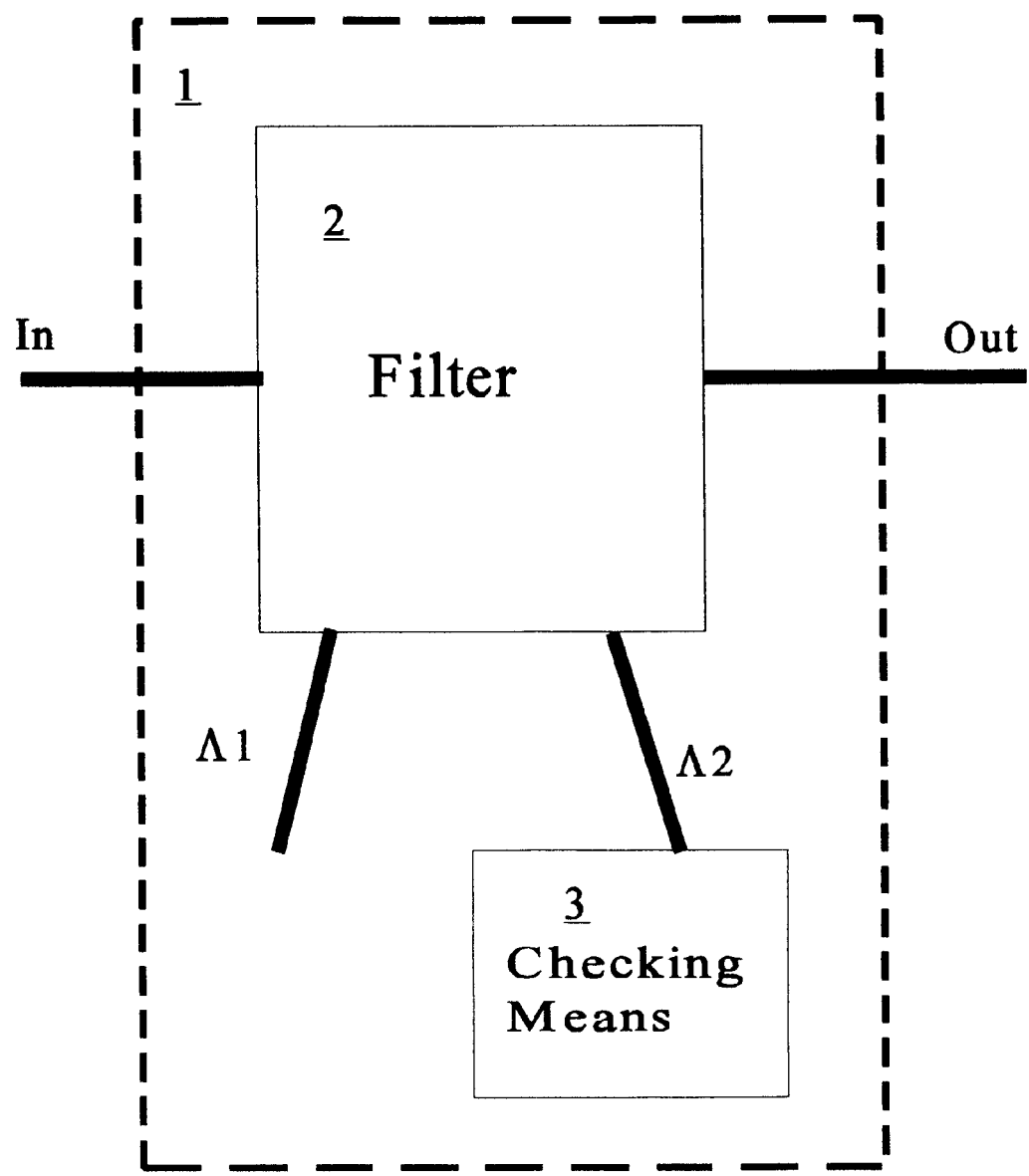
FIG. 1 shows in schematic form the arrangement of an embodiment of the present invention.

A system for checking the operation of a wavelength filter is shown at 1 in the block diagram of FIG. 1. The checking system 1 comprises wavelength filter 2 which receives an input shown at the left of the figure and produces an output shown at the right of the figure. The filter 2 comprises two or more selectively reflective elements (not shown) which act so as to reflect signals of particular wavelengths received from the input, two such reflected signals being shown by way of example labelled $\Lambda 1$ and $\Lambda 2$. Any signal received from the input that is not reflected in the filter passes through the filter to form the output signal. At least one of the selectively reflective elements (not shown) acts to reflect a wavelength signal ($\Lambda 2$) for detection by checking means 3. Checking means 3 is arranged to allow the checking system to determine the operation of filter 2, by checking reflected signal $\Lambda 2$.

According to an embodiment of the present invention, a filter has two selectively reflective elements (SRE) each associated with a different reflection wavelength band. The filter has a first SRE associated with a first reflection wavelength band that can be switched such that it will reflect a particular WDM data signal in one state and will pass the signal in a second state.

The filter has a second SRE associated with a second reflection wavelength band lying outside the part of the spectrum used for data signalling, i.e. the WDM (data) signal band. An additional light source provides a test signal overlapping the filter's second reflection wavelength band. The filter comprises a tuning mechanism for altering the spectral characteristics of the filter, i.e. shifting the reflection bands. The tuning mechanism applies to both SREs and therefore affects both reflection wavelength bands, that is the first (data) one inside and the second (test) one outside of the WDM (data) signal band. Any adjustment to one of the reflection wavelength bands automatically results in a corresponding adjustment to the other. Hence the functioning of the first SRE may be determined by monitoring a signal reflected by the second SRE, without disrupting or otherwise adversely affecting the data signals.

Figure 2A:
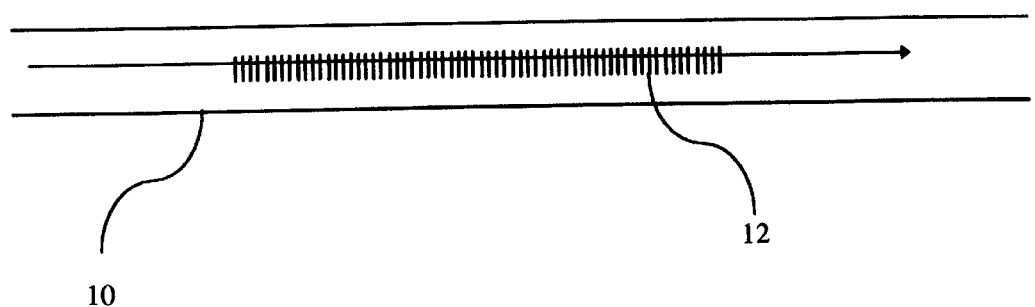
FIGS. 2A and 2B show in schematic form a cross section through a fibre Bragg grating of the prior art to illustrate the functioning thereof.
Figure 2B:
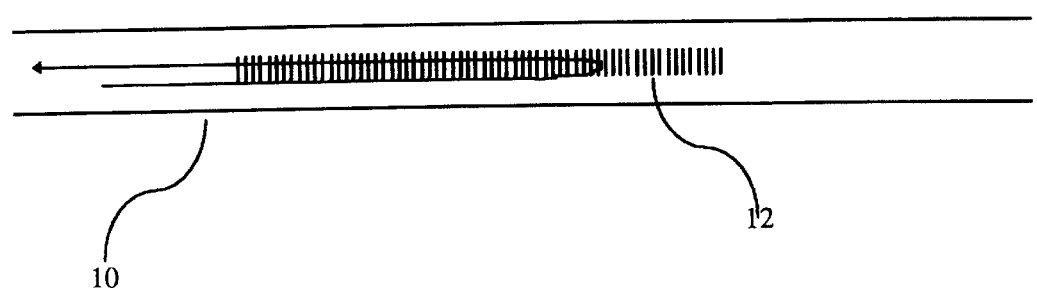

The filter could advantageously comprise a fibre Bragg grating, as shown in FIGS. 2A and 2B. FIG. 2A shows a fibre Bragg grating consisting of an optical fibre 10 in which a series of variations (represented diagrammatically by the lines 12) in the refractive index of the material (e.g., glass) of the optical fibre are formed. The lines form a diffraction grating that acts to pass incident radiation of most wavelengths (as represented by the arrow of FIG. 2A) and to reflect incident radiation of particular wavelengths (as represented by the arrow of FIG. 2B), depending on the spacing of the lines. In a fibre Bragg grating according to a particular embodiment of the present invention, the lines form two series or selectively reflective elements, each selectively reflective element reflecting incident radiation of a different wavelength. In a further embodiment, the lines may form more than two series or selectively reflective elements, again each selectively reflective element reflecting incident radiation of a different wavelength.

A filter with two reflection bands can be created by 'writing' with a UV laser two superimposed holographic patterns in the fibre. Alternatively the filter could be written using a suitable phase mask. Hydrogen pre-sensitization and post-exposure annealing steps may be used. Variations in the refractive index may also be introduced into the core of an optical fibre by means of lithographic techniques. Suitable tuning mechanisms for a diffraction grating filter include heat, stress-applying mechanisms, electronic injection or depletion.

Alternatively, the filter could comprise a multilayer dielectric filter acting as a selectively reflective mirror with two reflection bands. In practice a plurality of such filters may be arranged in series with each successive filter active in a different part of the data band. Typically light reflected by a first multilayer dielectric filter will become incident at the next multilayer dielectric filter in the series, whereas light passed by a first FBG filter will become incident at the next FBG filter in the series.

Figure 3:
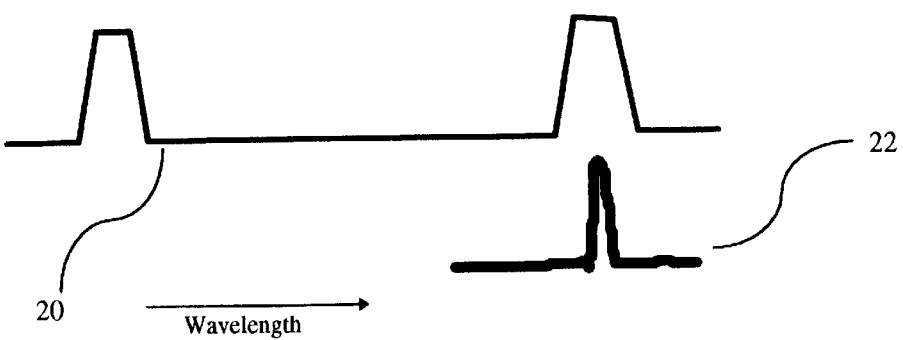
FIGS. 3, 4 and 5 represent the wavelength characteristic of a filter according to the present invention together with the wavelength characteristic of a variety of incident signals.

The wavelength characteristic of a filter with two selectively reflective elements according to the present invention is shown by way of example in FIG. 3. In FIG. 3 line 20 represents the variation in the reflectivity of the filter against wavelength. It can be seen that this wavelength characteristic has two distinct maxima, one maximum corresponding to the reflection wavelength band of each of the selectively reflective elements (SRE) of the filter. The right hand maximum corresponds to the data SRE and the left hand maximum to the additional, test SRE. The second line 22 represents an incident data signal. As can be seen from the figure, the wavelength of the incident signal coincides with the data maximum of the wavelength characteristic so that the particular signal will be reflected by the filter.

Figure 4:
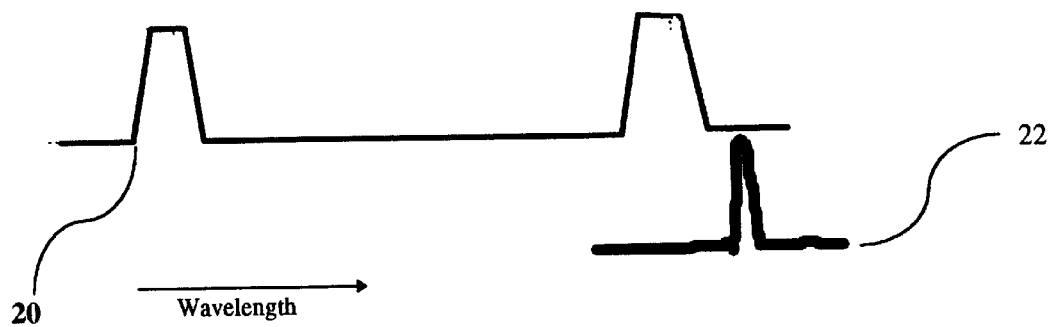

FIG. 4 shows the wavelength characteristic of an adjustable filter according to the present invention where the maxima on the wavelength characteristic have been shifted by activation of the filter tuning mechanism as described above. The incident data signal 22 is the same as that of FIG. 3 and it can be seen from FIG. 4 that the incident data signal no longer coincides with the data maximum in the filter wavelength characteristic with the result that the signal is now passed by the filter and no longer reflected. As illustrated in FIG. 4, activation of the filter to shift the position of the data maximum and corresponding reflection band results in a corresponding shift in the test maximum and corresponding reflection band on the left of the figure. In practice activation may be arranged to result in the reflection bands shifting to longer or to shorter wavelengths.

Figure 5:
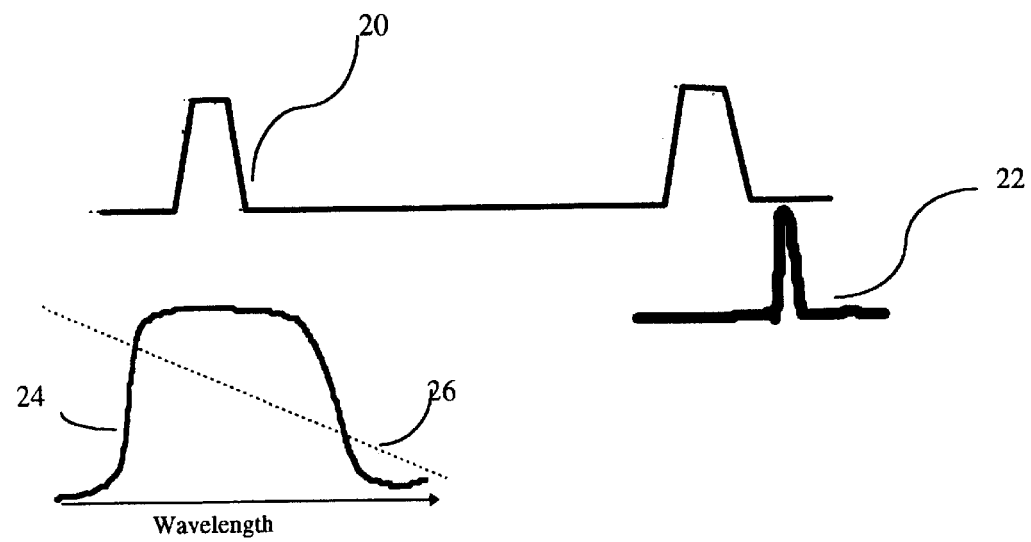

FIG. 5 shows the same situation as FIG. 4 but with a test signal 24 now included. Test signal 24 comprises a broad band signal sufficiently wide to cover the second, test reflection band in both the switched (activated) and unswitched states. In use the test signal is first passed through a optical filter with a monotonically sloping wavelength response (as indicated by dotted line 26 in the figure) and the resulting test signal, (not shown) with amplitude varying monotonically with wavelength, is then applied to the filter.

Figure 6:
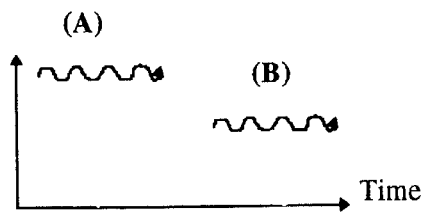
FIG. 6 shows a time versus amplitude plot of a signal reflected from the filter of the present invention.

A typical reflected test signal is shown in FIG. 6 by way of example. FIG. 6 represents an amplitude versus time plot of a signal reflected from the second, test reflection band of the filter when illuminated by the broad band test signal described above in relation to FIG. 5. In FIG. 6 the first segment (A) of the reflected signal is at a higher level. This corresponds to the filter being in the switched state (i.e. when activated) and reflecting a part of the incident test signal with a relatively high amplitude. The segment (B) represents the reflected test signal at a later time after the filter has returned to its unswitched state (i.e. deactivated). Here the second reflection band has shifted to a part of the incident test signal spectrum that has a relatively lower amplitude and the signal (B) has a correspondingly lower amplitude than the signal (A).

In practice the reflected signal may be arranged to have the greater amplitude in the unswitched state, either by arranging the sloping filter characteristic to slope in the opposite sense or by arranging the optical filter to switch in the opposite direction in the wavelength spectrum when activated. It is clear from FIG. 6 that an amplitude sensitive photodetector would be able to determine the switch state of the filter by monitoring the reflected test signal. If, on switching, the filter does not de-tune sufficiently to change state (i.e. from reflection to non-reflection, or vice versa) this will be detected by the monitoring system. Suitable measures, for example protection switching, can then be activated to maintain an acceptable level of service.

Hence, the operation upon switching of the filter may advantageously be checked by monitoring the test signal. However, it is also desirable to be able to monitor the operation of the filter (i.e. whether it responds to an activation signal) whilst staying in one or other of the switched states. This may be achieved, according to the present invention, as described below. The filter tuning (activation) mechanism may be activated at a lower level than that required to cause switching of the data signal but at a level sufficient to cause a detectable effect on signals in the second reflection band (e.g. by superimposing modulation thereon). The effect of this activation on the second reflection band may be monitored, for example by means of, a photodetector. The advantage of activating the filter at this lower level is that a discernable effect may be produced on the test signal without sensibly affecting the data (WDM) signal. Hence the operation of the filter may be determined even when it is not switching. In the event that the tuning mechanism fails to operate, the low level modulation will not be present on the reflected test signal and the failure will be detected.

In FIG. 6 it will be noted that the reflected test signal has a low level of modulation superimposed upon it. Optical communications networks commonly use a plurality of filters arranged in series in a single optical fibre in order to switch WDM signals. By adding a different form of modulation (e.g. frequency or code) to the activation signal provided to each one of a plurality of filters connected in series it is possible to distinguish between the reflected signals from the plurality of filters by monitoring the modulations received. The characteristic modulation (or dither signal) could, for example, have a frequency of 1 KHz.

Alternatively each filter may be monitored in turn by activating them sequentially. The signals reflected by the second selectively reflective elements of the plurality of filters can be monitored in synchronization with the time sequence.

The process steps in writing a fibre Bragg grating comprise: sensitizing the substrate (e.g. the optical fibre), writing the pattern, annealing the substrate and assembling or packaging. Once the writing and annealing are complete, the spectral characteristics of the filter are defined. However the assembly/packaging step or subsequent changes during the ageing process may produce drift in the spectral position of the reflection bands. It is therefore desirable to check the operation of the filter further by checking the wavelengths at which it will reflect and detecting unwanted drift in the spectral position of the reflection bands. In addition it may be possible to compensate for any detected drift. For example, with the filter of the invention, the second reflection band could be designed to reflect in a well defined spectral range, coinciding with a standard wavelength range from a stable source such as the HeNe laser (6328 nm) or the Nd;YAG laser (1060 nm). Then, after assembly, and/or during operation, the response in the second wavelength band may be checked continuously or periodically. This checking could use the stable wavelength laser source as a reference source. Detection of the reflected reference signal would indicate correct operation, failure to detect would indicate unacceptable spectral drift. The reflection from the filter could then be used to derive a control signal to the filter tuning mechanism to correct for any unwanted change.

By way of example, the data SRE could be created with a reflection band around a wavelength of 1.5 microns with the test SRE created to reflect a standard laser emission, say 1.25 microns wavelength. At any time the correct positioning of the reflection band of the data SRE may be checked by adjusting the drive level to the tuning mechanism until the incident laser test signal at 1.25 microns is reflected by the test SRE. Hence it is possible to calibrate the filter tuning mechanism. The calibration may be refined by providing for a second reflected test signal at a different wavelength so that the tuning mechanism drive level may be checked at two points in its range. This refinement would allow change in reflection wavelength per unit change in drive level to be determined in addition to identifying a particular reflection wavelength with a particular drive level. Advantageously, if two reflected test signals are provided, they may be used to allow checking to be carried out with the filter in the switched and unswitched states.

The two reflected test signals may be provided either by means of a pair of lasers emitting test signals at different wavelengths or by providing the filter with an additional SRE so that it exhibits one data and two test reflection bands.

If two reflected test signals are provided, as described above, these may be used in place of the broad-band test signal, described above, to check the switch state of the filter.

The detector for the test signals would be able to discriminate between the two reflected test signals by detecting a difference in frequency, amplitude or in some other distinguishing characteristic, such as modulation.

Hence the present invention produces a system and method for monitoring a filter in its usual or de-activated state and assessing its integrity, to establish confidence that when an activation signal is applied it will operate and switch reliably to its second state. A filter may exhibit slow changes or drift in its reflection characteristics with time. Such drift could impair the effectiveness of the device as a band-pass filter, band stop filter, notch filter, switch or attenuator. The present invention also provides a system and method for continuously checking the operation of such filters so that drift may be detected and corrected.

The skilled worker in the field will realize that the present invention applies equally to non-tunable filters, i.e. to filters with two fixed selectively reflective elements one of which is used to reflect a data signal the second to reflect a test signal. In such an application the invention will allow checking of various aspects of the filter, for example whether a filter is present at a particular location and also checking the filter for any drift in the spectral location of its reflection bands.

I claim:

1. A system for checking operation of a wavelength filter, comprising:
   a wavelength filter comprising a first selectively reflective element (SRE) for reflecting a first signal of a first wavelength and a second SRE for reflecting a second signal of a different wavelength; and
   checking means for checking the operation of the wavelength filter by detecting the signal reflected by a particular one of the SREs, said first and second SREs being superposed.

2. The system of claim 1 in which the particular one of the SREs is associated with a reflection wavelength band that lies outside of a data band and the other of the SREs is associated with a reflection wavelength band that lies inside of the data band.

3. The system of claim 1 in which the filter comprises an adjusting means for adjusting the wavelength reflected by the first SRE and the wavelength reflected by the second SRE in which, in operation, adjustment of the wavelength reflected by the first SRE results in a corresponding adjustment of the wavelength reflected by the second SRE.

4. The system of claim 1 in which the filter comprises an adjusting means for introducing a change in the wavelength reflected by the first SRE and automatically introducing a corresponding change in the wavelength reflected by the second SRE.

5. The system of claim 1 in which the wavelength filter comprises an optical wavelength filter.

6. The system of claim 5 in which the optical wavelength filter comprises a fibre Bragg grating.

7. The system of claim 5 in which the optical wavelength filter comprises a multilayer dielectric filter.

8. The system of claim 5 in which a plurality of optical wavelength filters are arranged in series.

9. The system of claim 8 in which a single checking means is used for checking the operation of the plurality of optical wavelength filters.

10. The system of claim 3 in which, the adjusting means comprises modulation means for introducing a characteristic modulation into the signal reflected by the particular one of the SREs.

11. The system of claim 10 in which the wavelength filter comprises a plurality of optical wavelength filters arranged in series, and in which the modulation means of each of the plurality of optical wavelength filters is arranged to introduce a different characteristic modulation into the signal reflected by the particular one of the SREs of each one of the plurality of optical wavelength filters.

12. The system of claim 11 in which, in operation, the operation of the plurality of optical wavelength filters is checked simultaneously.

13. The system of claim 9 in which, in operation, the operation of the plurality of optical wavelength filters is checked sequentially.

14. The system of claim 6 in which the fibre Bragg grating comprises a pattern comprising variations of the refractive index of a core region of an optical fibre.

15. The system of claim 1 also comprising means for generating a broad-band signal whose amplitude varies monotonically with wavelength for reflection by the particular one of the SREs and in which the checking means comprises means for detecting the amplitude of the signal reflected by the particular one of the SREs.

16. The system of claim 3 also comprising means for generating a narrow band signal for reflection by the particular one of the SREs.

17. The system of claim 3 comprising means for generating a first and a second narrow band signal for reflection by the particular one of the SREs.

18. The system of claim 16 in which the filter also comprises a third SRE for reflecting the narrow band signal.

19. The system of claim 17 arranged to generate a first narrow band reflected signal when adjusted to a first state and a second narrow band reflected signal when adjusted to a second state.

20. The system of claim 19 in which the first and second narrow band reflected signals are differentiated by modulation.

21. The system of claim 18 comprising a means for adjusting the wavelength reflected by the other one of the SREs based on the detection of the signal reflected by the particular one of the SREs or by the third SRE.

22. A method for checking operation of a wavelength filter comprising a first selectively reflective element (SRE) for reflecting a first signal of a first wavelength and a second SRE for reflecting a second signal of a different wavelength; the method comprising the step of detecting the signal reflected by a particular one of the SREs, in which the first and second SREs are superposed.

23. The method of claim 22 in which the signal reflected by the particular one of the SREs lies outside of a data band and the signal reflected by the other one of the SREs lies inside of the data band.

24. The method of claim 22 comprising the step of providing a broad band signal whose amplitude varies monotonically with wavelength for reflection by the particular one of the SREs.

25. The method of claim 22 comprising the step of providing one or more narrow band signals for reflection by the particular one of the SREs.

26. The method of claim 22 comprising the step of detecting the amplitude of a signal reflected by the particular one of the SREs.

27. The method of claim 22 comprising the steps of introducing a characteristic modulation into the signal reflected by the particular one of the SREs and detecting the modulation of the signal reflected by the particular one of the SREs.

28. The method of claim 22 in which the filter comprises an adjusting means for introducing a change in the wavelength reflected by the other one of the SREs and automatically introducing a corresponding change in the wavelength reflected by the particular one of the SREs, the method comprising the step of checking the wavelength of a signal reflected by the particular one of the SREs.

29. The method of claim 22 in which the filter comprises an adjusting means for introducing a change in the wavelength reflected by the other one of the SREs and automatically introducing a corresponding change in the wavelength reflected by the particular one of the SREs, the method comprising the steps of adjusting the filter to reflect different wavelengths and of checking the operation of the adjusting means with the filter adjusted to reflect different wavelengths.

30. The method of claim 22 for detecting drift in the wavelength characteristic of the filter.

31. A wavelength division multiplexing (WDM) switch comprising a system for checking operation of a wavelength filter, in which the system comprises a wavelength filter comprising a first selectively reflective element (SRE) for reflecting a first signal of a first wavelength and a second SRE for reflecting a second signal of a different wavelength; the system also comprising checking means for checking the operation of the wavelength filter by detecting the signal reflected by a particular one of the SREs, said first and second SREs being superposed.

32. A wavelength division multiplexing (WDM) optical communications system comprising a system for checking operation of a wavelength filter, in which the system comprises a wavelength filter comprising a first selectively reflective element (SRE) for reflecting a first signal of a first wavelength and a second SRE for reflecting a second signal of a different wavelength; the system also comprising checking means for checking the operation of the wavelength filter by detecting the signal reflected by a particular one of the SREs, said first and second SREs being superposed.

* * * * *